March 15, 1960 L. V. PFAENDER 2,928,967
BRACKETS FOR GLASS PARTS AND METHOD OF ATTACHMENT
Filed Sept. 13, 1956 2 Sheets-Sheet 1
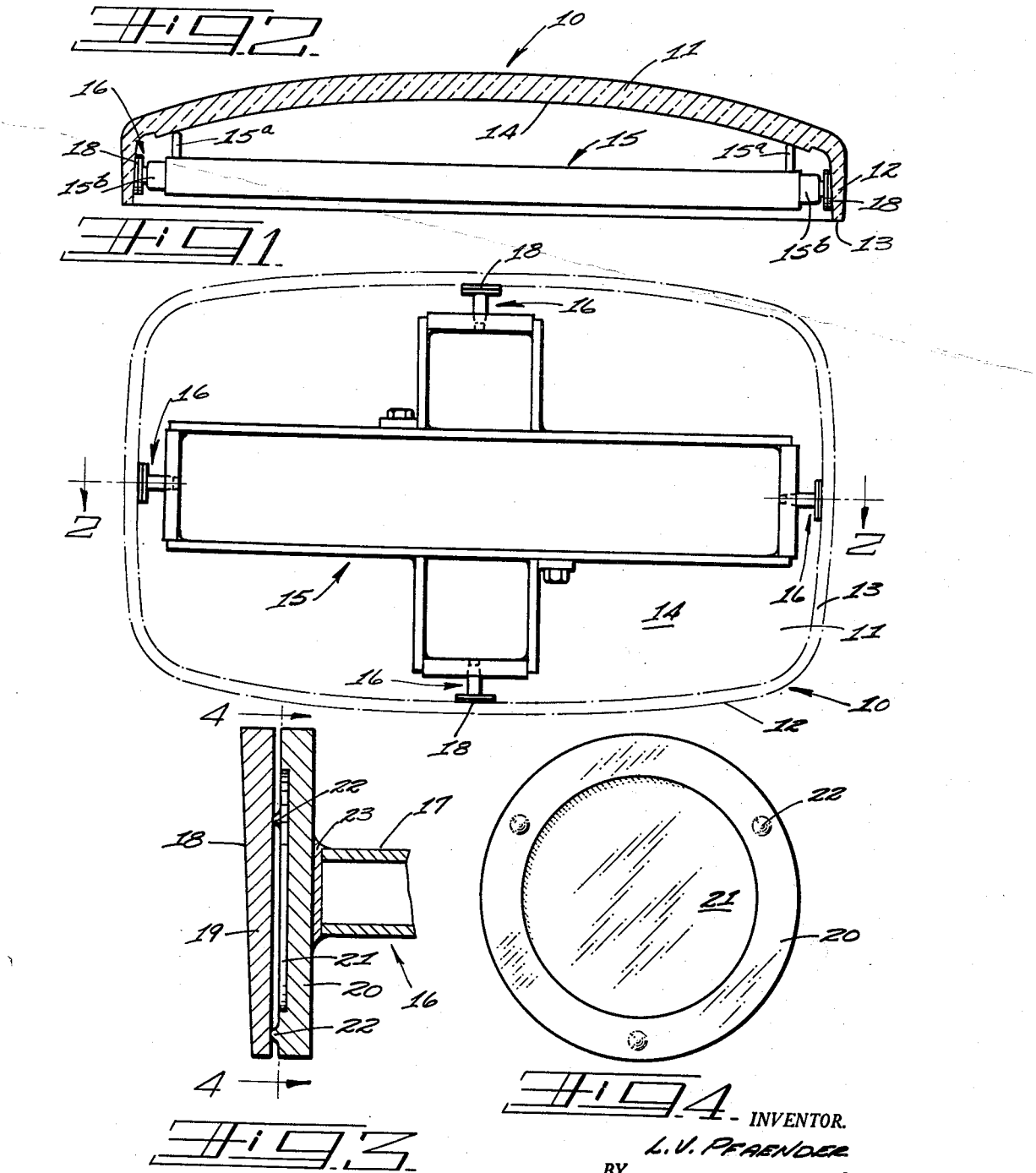
INVENTOR.
L. V. PFAENDER
BY
W. A. Schaich
Leonard D. Soulier
ATTORNEYS

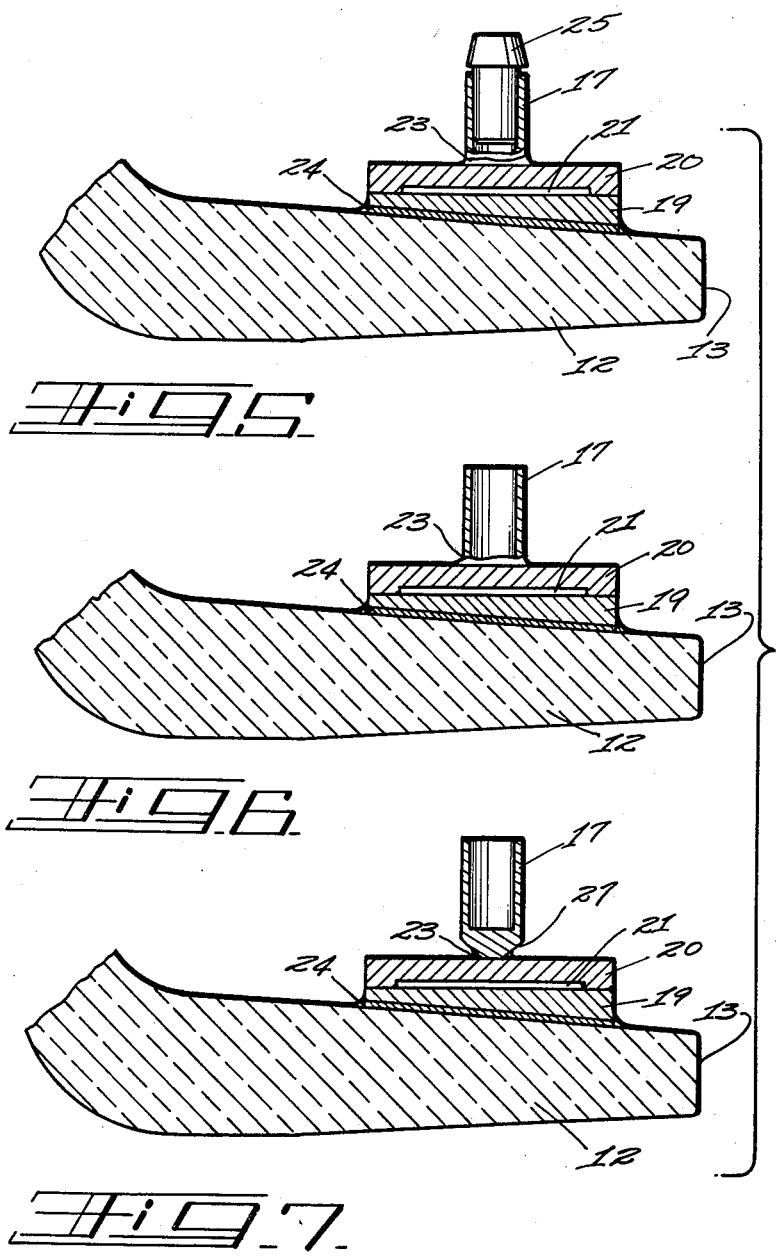

United States Patent Office 2,928,967
Patented Mar. 15, 1960

2,928,967
BRACKETS FOR GLASS PARTS AND METHOD OF ATTACHMENT

Lawrence V. Pfaender, Toledo, Ohio, assignor to Owens-Illinois Glass Company, a corporation of Ohio Application September 13, 1956, Serial No. 609,728

3 Claims. (Cl. 313—64)

The present invention relates to an improved support bracket for uniting to preformed glass parts such as utilized to form a cathode-ray tube envelope and to the method of attaching a plurality of such support brackets in precise alignment within a component part of a tube envelope.

The development of color television picture tubes has been hindered by the stringent requirements of precise alignment of internal components particularly the color-producing assembly mounted within the face plate portion of the tube. An apertured electrode structure such as a shadow mask or line grid is frequently disposed adjacent to the screen to control electron impingement upon phosphors capable of producing three primary colors. The electrode structure in present practice consists of a heavy frame and bulky clamping mechanism both of which add to the difficulty of tube assembly and exhaust. The location of the apertured electrode must be carefully controlled with respect to the phosphor screen in the manufacture of each individual tube for proper color registry. Additionally, the structure must be capable of being removed from and relocated in exactly the same position within the area of the face plate during tube manufacturing processes.

Accordingly, it is an object of this invention to provide an improved support member composed of several sections which may be attached to glass stepwise to obtain a high degree of locating accuracy of an internal portion.

Another object of this invention is to provide a metallic bracket having a pedestal-shape and separable base and post sections which are joined lastly by localized fusion to produce extreme accuracy of the post section for supporting and locating an electronic element in a cathode-ray picture tube.

Another object of this invention is to provide novel support brackets for restraining and positioning a color-control element within the glass face plate portion of a cathode-ray tube which brackets are employed in combination of two or more radially disposed in spaced relationship about the interior surface of a face plate.

Another object of this invention is to provide a method of installing a plurality of the subject brackets for retention of the color-control element in a cathode-ray picture tube.

A further object of this invention is to provide a spaced-apart series of similar support brackets having precisely located post sections which may be adhered interiorly of a glass face plate perpendicular to the tube axis for detachable retention of a color-control structure therebetween in a reproducible and reuseable aligned position.

A still further object is to furnish an improved glass face plate for a color-producing cathode-ray picture tube, said face plate having a plurality of novel metallic support members of simple construction interiorly affixed to its flange portion in exact alignment for utilization in existing and proposed types of color picture tubes.

The specific nature of the invention, as well as other objects and advantages thereof, will become apparent to those skilled in the art from the following detailed description, taken in conjunction with the annexed sheet of drawings on which, by way of preferred example only, are illustrated the preferred embodiments of this invention.

On the accompanying drawings:

Fig. 1 is a plan view of a jig assembly for positioning the subject support brackets in a cathode-ray tube face plate in accordance with the present invention.

Fig. 2 is a vertical sectional view taken along the line 2—2 of Fig. 1.

Fig. 3 is an enlarged vertical sectional view of the base portion of an individual bracket.

Fig. 4 is an enlarged plan view of one base section taken along the line 4—4 of Fig. 3.

Figs. 5, 6 and 7 are enlarged vertical sectional views of various modifications of the bracket attached to the face plate.

While this invention will be described as specifically applied to the manufacture of a cathode-ray tube and its viewing portion in particular it will be apparent to those skilled in the art that the principles of the invention are equally applicable to the manufacture of any type of preformed rigid glass article upon which it is desired to position another element in precise alignment therewith.

A preferred embodiment of this invention consists of a glass face plate 10 having a uniformly curved viewing panel 11 and a depending annular flange portion 12 which terminates at a planar annular sealing surface 13. Face plate 10 may be either circular or rectangular in overall contour, being shown as the latter as employed in so-called rectangular-type black and white television picture tubes. The interior surface of viewing panel 11 has deposited thereon a layer 14 of phosphor material which constitutes the target or image-producing area of a cathode-ray picture tube. Of course, the particular phosphor materials employed may be varied widely as known in the art and do not constitute a part of this invention.

However, as is also well known, the conventional phosphor layer 14 and other internal electronic elements of the tube are subject to heat damage at elevated temperatures, and tube processing procedures must be so arranged as to avoid over-heating. Furthermore, glass face plate 10 and particularly its sealing surface 13 may be warped, distorted or unnecessarily stressed when subjected to elevated temperatures to complicate adequate vacuum sealing of the part, and it is for all of these reasons that relatively low-temperature tube fabrication is required at temperatures below approximately 425° C.

An electronic color-producing structure (not shown) such as a shadow mask or line grid is exactly aligned with phosphor layer 14 to control and accelerate electron impingement upon desired areas of phosphor. This structure is normally fitted within flange portion 12 in close proximity to phosphor layer 14 and in extremely precise alignment therewith as well as with one or more beam guns mounted in the neck of the tube directed at such layer.

An assembly jig 15 is temporarily placed within the interior of face plate 10 (Fig. 1) with predetermined spaced-apart peripheral areas adapted to retain a plurality of support brackets 16. Jig 15 usually has four or more spacing members 15a which properly dispose the series of brackets 16 against flange portion 12 in alignment with phosphor layer 14. Brackets 16 are generally positioned in the same plane at right angles to each other contacting the inner surfaces of flange portion 12. Jig 15 has four openings on its periphery which temporarily restrain the inwardly directed free ends of brackets 16 during their permanent affixation, after which the jig is removed. Jig 15 is shown on Fig. 2 as having a welding ferrule 15b surrounding an inner post section of each bracket 16 for its precise positioning.

Brackets 16 are composed of metal, such as #430 stainless steel for example having thermal contraction characteristics compatible with the parent glass, and have a pedestal-shape comprised of a base section 18 and post section 17. Base section 18 consists of two circular discs of approximately the same diameter which are adapted to be sealed together in face-to-face relationship by peripheral point contact such as by spot welding. Base section 18 (Fig. 3) consists of circular discs 19 and 20 which is adapted to be initially sealed to glass, either by direct glass-to-metal fusion or by interposing a layer 24 (Fig. 4) of low-melting glass-to-metal sealing composition therebetween. Such sealing compositions have been fully disclosed in the copending patent application of Francl and Hagedorn entitled "Low Melting Glass Sealing Composition," filed December 22, 1955, Serial No. 554,753, now abandoned. Disc 20 is of uniform thickness with a central recess 21 on its joining surface adapted to be separately sealed to disc 19 before the attachment of base 18 to flange portion 12. Recess 21 between discs 19 and 20 serves as an insulating barrier between the inner surface of disc 20 and the glass as well as to peripherally distribute bracket loading. Three small protuberances 22 are located at equiangular peripheral areas of disc 20 surrounding cavity 21 which are adapted to make point contact with disc 19 for uniting the same such as by spot welding.

A hollow metallic stud 17 is attached to a central area of the inner surface of disc 20 by solder or welding material 23 while retained by jig 15 for subsequent retention of a peripheral area of the color-producing structure. In order to establish the precise mounting of bracket 16 with respect to phosphor layer 14 metal discs 19 and 20 are first attached to glass flange portion 12 with a low-melting glass sealing composition 24 in approximately the desired locations. This is normally done before the contours of the surfaces of viewing panel 11 and sealing edge 13 are finally shaped by conventional methods such as grinding. The glass part is then annealed after which small distortions incurred during the disc attaching process may be corrected such as by further grinding.

After the part is thoroughly washed, phosphor layer 14 is deposited, and all other required processing has been completed, as a final operation the inner post section of each support member or bracket 16, namely the stud 17 is then welded to disc 20 utilizing holding jig 15. Base 18 and stud 17 of each bracket 16 are fabricated separately and united lastly by stud welding after indexing from the prepared inside face of phosphor material. The elevated welding temperatures are so localized by point contact that the glass part is not damaged by welding heat with the base having a lateral insulating space. Thus each of the brackets 16 are properly positioned in precise alignment with phosphor layer 14.

In one modification of the present invention (Fig. 5) stud 17 has fitted into its interior a solid pin 25 having a tapered free end adjustable for length adapted to accurately position the periphery of the color-producing structure. Pin 25 may be firmly held in stud 17 by a spot weld or a set screw. In Fig. 6, hollow stud 17 is employed alone into which is friction-fitted a spring-mounted pin located on the periphery of the structure. In Fig. 7, hollow stud 17 has a tapered end 27 for attachment to disc 20 by welding or soldering with reduced contacting area. The contacting peripheral areas of discs 19 and 20 shown in Figs. 5, 6 and 7 consist of annular rings in planar contact surrounding central recess 21. Thus the loads placed upon stud 17 are distributed to annular areas of base discs 19 and 20 and thereby to more extensive areas of the glass flange to eliminate and minimize stresses therein.

It may be found necessary to incorporate one of the types of stud 17 which when completely assembled is adjustable in length as shown in Fig. 5. Since this dimension cannot be exactly retained the combination of the above stud welding process and the utilization of a stud assembly which is adjustable for length furnishes a relatively simple method of locating support members accurately from a ground or polished especially prepared viewing surface.

It will, of course, be understood that various details of construction may be modified through a wide range without departing from the principles of this invention, and it is not the purpose to limit the patent granted hereon otherwise than necessitated by the scope of the appended claims.

I claim:

1. In a hollow glass face plate for a cathode ray tube envelope having a viewing panel and an annular integral flange extending about the periphery of the panel, the improvement of a mask-supporting structure comprising a plurality of peripherally spaced metallic supporting studs projecting inwardly from the flange, and a pair of superimposed metallic disks interposed between each of the studs and the adjacent portion of the flange, the disks being peripherally secured to one another and the center portions of said disks being spaced to define an insulating cavity therebetween, the inner disk of each pair being secured to the glass flange by a low melting glass composition and the other disk of each pair having one of said studs secured to the central portion thereof in alignment with said cavity.

2. In a glass cathode ray tube face plate for positioning at one axial end of a glass envelope and having a viewing panel and a peripheral flange surrounding the panel to project axially thereof, the flange tapering from the panel to a reduced terminal edge, the improvement of means for mounting a tube component on the face plate, comprising a plurality of mounting plate assemblies spaced peripherally on the face plate flange, each of said assemblies including a pair of superimposed metallic plates the inner plate being secured directly to the flange by a low melting glass composition and being tapered to compensate for the flange taper and the outer plate being secured peripherally to the inner plate, the plate assemblies each enclosing a central cavity insulating the central portion of the outer plate from the flange and a metallic mounting stud rigidly secured to the central portion of each of said inner plates, said studs projecting inwardly in direction normal to the axis of the face plate.

3. A hollow glass face plate in accordance with claim 1, wherein said support members are composed of metal alloy having thermal contraction adapted to direct fusion to the glass.

References Cited in the file of this patent

UNITED STATES PATENTS

| Re. 23,735 | Olson | Nov. 10, 1953 |
| 2,360,279 | Rollert | Oct. 10, 1944 |
| 2,546,828 | Levy | Mar. 27, 1951 |
| 2,625,734 | Law | Jan. 20, 1953 |
| 2,629,093 | Pask et al. | Feb. 17, 1953 |
| 2,643,020 | Dalton | June 23, 1953 |
| 2,727,172 | Mark et al. | Dec. 13, 1955 |
| 2,740,186 | Gates | Apr. 3, 1956 |
| 2,745,738 | Phillips et al. | May 15, 1956 |
| 2,782,952 | Dalton et al. | Feb. 26, 1957 |
| 2,846,608 | Shrader | Aug. 5, 1958 |